(12) United States Patent
Canini et al.

(10) Patent No.: US 12,406,498 B2
(45) Date of Patent: Sep. 2, 2025

(54) IMAGING SYSTEMS WITH ENHANCED FUNCTIONALITIES WITH EVENT-BASED SENSORS

(71) Applicant: Datalogic IP Tech S.r.l., Calderara di Reno (IT)

(72) Inventors: Federico Canini, Zola Predosa (IT); Ali Al-Erwi, Bologna (IT); Francesco D'Ercoli, Bologna (IT); Matteo Del Castello, Mestrino (IT); Amedeo Pisapia, Bologna (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 152 days.

(21) Appl. No.: 18/313,250

(22) Filed: May 5, 2023

(65) Prior Publication Data

US 2023/0360398 A1    Nov. 9, 2023

Related U.S. Application Data

(60) Provisional application No. 63/339,318, filed on May 6, 2022.

(51) Int. Cl.
*G06V 20/40* (2022.01)
*G06T 7/20* (2017.01)
(Continued)

(52) U.S. Cl.
CPC ............... *G06V 20/44* (2022.01); *G06T 7/20* (2013.01); *G06T 7/62* (2017.01); *H04N 1/2133* (2013.01);
(Continued)

(58) Field of Classification Search
CPC .. G06V 20/44; G06T 7/20; G06T 7/62; H04N 1/2133; H04N 23/617; H04N 23/90; (Continued)

(56) References Cited

U.S. PATENT DOCUMENTS

| 10,917,594 B2 | 2/2021 | Suh et al. |
| 11,122,224 B2 | 9/2021 | Suh et al. |

(Continued)

FOREIGN PATENT DOCUMENTS

| EP | 3 730 256 A1 | 10/2020 |
| KR | 20180058162 A | 5/2018 |

(Continued)

OTHER PUBLICATIONS

International Search Report and Written Opinion for PCT/EP2023/062059 dated Jul. 20, 2023, 19 pps.

(Continued)

*Primary Examiner* — Shahbaz Nazrul
(74) *Attorney, Agent, or Firm* — Foley & Lardner LLP

(57) ABSTRACT

The disclosure includes imaging systems employing event-based sensors in various applications for analyzing a scene, such as those involved in conveyor systems, mass flow detection systems, portals, machine vision systems, retail settings including checkout stations, and the like. Event-based sensors may be operated in conjunction with frame-based cameras to select frames or subparts of frames or otherwise trigger actions related to the imaging system based on analysis of the events generated by the event-based sensors.

20 Claims, 17 Drawing Sheets

(51) Int. Cl.
*G06T 7/62* (2017.01)
*H04N 1/21* (2006.01)
*H04N 23/617* (2023.01)
*H04N 23/90* (2023.01)
*H04N 25/47* (2023.01)
*H04N 101/00* (2006.01)

(52) U.S. Cl.
CPC .......... *H04N 23/617* (2023.01); *H04N 23/90* (2023.01); *H04N 25/47* (2023.01); *H04N 2101/00* (2013.01)

(58) Field of Classification Search
CPC .. H04N 25/47; H04N 2101/00; H04N 25/707; G06Q 10/083; G06Q 10/08
See application file for complete search history.

(56) References Cited

U.S. PATENT DOCUMENTS

| | | | | |
|---|---|---|---|---|
| 11,151,343 | B2* | 10/2021 | Müller | G06K 7/1478 |
| 11,386,602 | B2* | 7/2022 | Wilcox | B65G 43/10 |
| 2010/0036522 | A1* | 2/2010 | Stich | G06Q 10/08 |
| | | | | 700/226 |
| 2020/0144938 | A1 | 5/2020 | Gulati et al. | |
| 2021/0125362 | A1 | 4/2021 | Müller et al. | |
| 2021/0141094 | A1 | 5/2021 | Russ et al. | |
| 2023/0084807 | A1* | 3/2023 | Taamazyan | G06T 7/521 |
| | | | | 382/154 |
| 2023/0192418 | A1* | 6/2023 | Horowitz | G06T 7/20 |
| | | | | 198/349 |
| 2023/0412930 | A1* | 12/2023 | Bury | H04N 25/60 |
| 2024/0329248 | A1* | 10/2024 | Smits | G06V 20/52 |

FOREIGN PATENT DOCUMENTS

| | | |
|---|---|---|
| KR | 101970410 B1 | 8/2019 |
| KR | 102027671 B1 | 11/2019 |
| NL | 2023646 B1 | 2/2021 |
| WO | WO-2013/055359 A1 | 4/2013 |
| WO | WO-2013/055366 A1 | 4/2013 |
| WO | WO-2019/088609 A1 | 5/2019 |
| WO | WO-2021/117639 A1 | 6/2021 |
| WO | WO-2021/117642 A1 | 6/2021 |
| WO | WO-2021/117675 A1 | 6/2021 |
| WO | WO-2021/117676 A1 | 6/2021 |

OTHER PUBLICATIONS

Leow, H.S. et al., Machine Vision Using Combined Frame-Based and Event-Based Vision Sensor, 2015 IEEE International Symposium on Circuits and Systems (ISCAS), IEEE, May 24, 2015, pp. 706-709, 4 pps.

Cohen et al., Event-Based Sensing for Space Situational Awareness, 2017 Advanced Maui Optical and Space Surveillance Technologies Conference (AMOS), 13 pps.

Commercial proposal by Prophesee, downloaded from https://www.prophesee.ai/2019/07/28/event-based-vision-2/ on May 5, 2022.

Event-based camera dataset (Davis technology), downloaded from http://rpg.ifi.uzh.ch/davis_data.html on May 5, 2022.

Event-based Vision: A Survey, downloaded from https://ieeexplore.ieee.org/document/9138762 on May 5, 2022.

Li, et al., Event-Based Vision Enhanced: A Joint Detection Framework in Autonomous Driving, 2019 IEEE International Conference on Multimedia and Expo (ICME), 6 pps.

Resources from github repo, downloaded from https://github.com/SensorsINI/jaer on May 5, 2022.

Resources from github repo, downloaded from https://github.com/uzh-rpg/event-based_vision_resources on May 5, 2022.

Santos et al., Event-Based Sensing and Control for Remote Robot Guidance: An Experimental Case, Sep. 6, 2017, MDPI Sensors 2017, 17, 2034, 20 pps.

Tayarani-Najaran et al., Event-Based Sensing and Signal Processing in the Visual, Auditory, and Olfactory Domain: A Review, Frontiers in Neural Circuits, Review, May 31, 2021, 31 pps.

White Paper, Event-Based Sensing Enables a New Generation of Machine Vision Solutions, Prophesee Metavision for Machines, Prophesee, Feb. 2018, 14 pps.

* cited by examiner

IMAGING SYSTEMS WITH ENHANCED FUNCTIONALITIES WITH EVENT-BASED SENSORS

PRIOR APPLICATION

This application claims the benefit of U.S. Provisional Application No. 63/339,318, filed May 6, 2022, and entitled "IMAGING SYSTEMS WITH ENHANCED FUNCTIONALITIES WITH EVENT-BASED SENSORS," the disclosure of which is incorporated by reference herein in its entirety.

TECHNICAL FIELD

The present disclosure relates generally to scanners or event-based sensors, and more particularly, to computer vision systems or other imaging systems having event-based sensors and frame-based sensors and related methods of implementation.

BACKGROUND

Event-based vision processing relies on event-based sensors that, differently than traditional frame-based sensors, do not capture image brightness at a fixed rate, but rather asynchronously measure brightness changes on a per-pixel basis, finally providing in output a stream of asynchronous and independent events. This kind of sensor has been commercially available since 2008 (e.g., by vendors such as Samsung, iniVation, and Prophesee), and the inventors have appreciated improved systems that can be used to build intrinsically low-latency, low-power, and very high-dynamic range, imaging cameras for robotics and computer vision challenging scenarios, where fast motion is involved and built-in invariance to scene illumination is required.

BRIEF SUMMARY

An imaging system may include a frame-based sensor configured to generate image frames of a scene, an event-based sensor configured to generate an event stream, and a stream processor configured to receive the event stream and analyze the events to determine if a predetermined criteria for the event stream is satisfied, and in response thereto generate a real-time frame trigger to select one or more image frames captured by the image processor for analysis by an image processor.

An imaging system may include a plurality of event-based sensors having fields-of-view that at least partially overlap, a plurality of laser projectors associated with each of the event-based sensors, and configured to project a complex laser pattern in a corresponding field-of-view of the associated event-based sensor, and an event stream processor configured to analyze event streams from each of the event-based sensors and to determine at least one characteristic of an object based on the event streams.

A conveyor system may include an illumination system comprising a conveyor system controlled by a programmable logic controller (PLC), a plurality of event-based sensors having fields-of-view over the conveyor system, and an event stream processor configured to analyze event streams from each of the event-based sensors and to provide feedback to the PLC for the PLC to control movement of the conveyor system based on kinematics information for parcels on the conveyor system as determined from the event streams.

A conveyor system may include an illumination system comprising a conveyor system, an event-based sensor having a field-of-view over the conveyor system, and an event stream processor configured to: analyze event streams from the event-based sensors, detect vibrations of the conveyor system based on the event stream, and generate a diagnostic report based on the detected vibrations.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
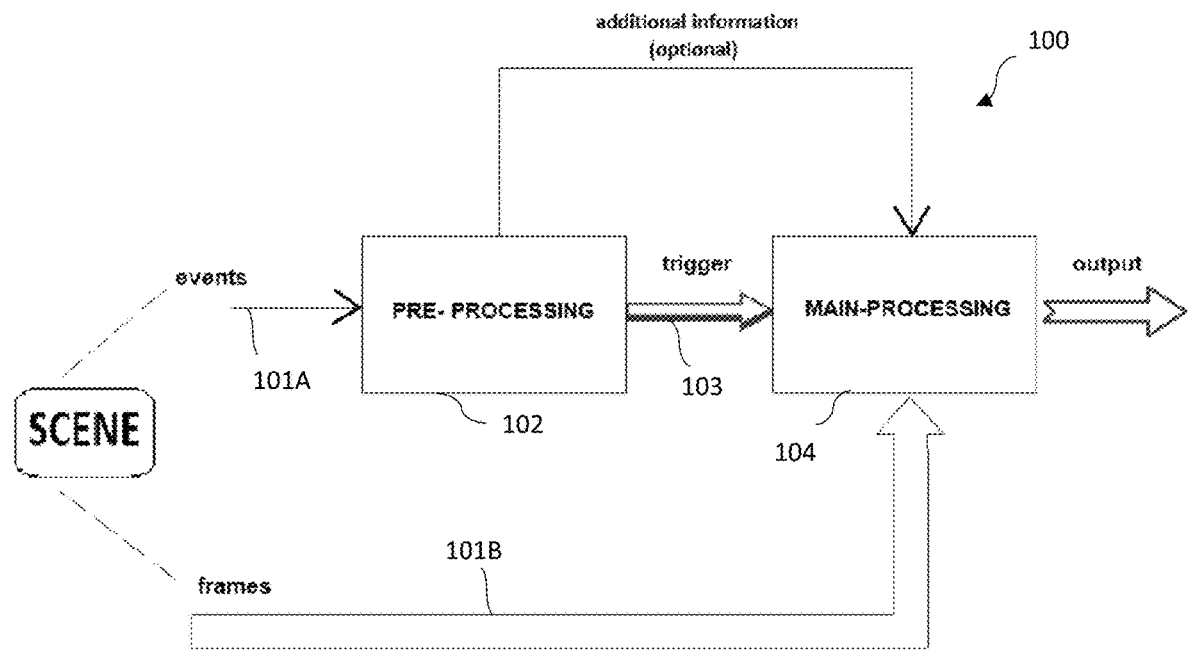
FIG. 1 is a simplified block diagram of a machine vision system according to an embodiment of the disclosure.

The illustrations included herewith are not meant to be actual views of any particular systems, memory device, architecture, or process, but are merely idealized representations that are employed to describe embodiments herein.

Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Embodiments of the disclosure include systems and methods that combine in the same vision system an event-based sensor with a frame-based sensor without needs for calibration or time-synchronization between the two distinct sensors. "Event-based sensor" may also be referred to as "event-based camera" or "event-based imager." Likewise, "frame-based sensor" may be referred to as "frame-based camera" or "frame-based imager." Each of the event-based sensor and frame-based sensor (or any other sensor) may be formed of one or more sensors configured to executed the same or different software instructions that perform the functions described herein.

Frame-based sensors may typically include solid-state image circuitry, such as charge coupled devices (CCDs) or complementary metal-oxide semiconductor (CMOS) devices, and may be implemented using a one-dimensional or two-dimensional imaging array of photosensors (or pixels) to capture an image of the optical code. One-dimensional imagers typically capture a linear cross section of an image. Two-dimensional CCD or CMOS imagers may capture an entire two-dimensional image.

Event-based sensors are an alternative to frame-based approach by acquiring a temporal luminance profile sensed by each pixel of a scene. Examples of such an event-based sensor include the Prophesee Metavision® Packaged Sensor from Prophesee of Paris, France, or other similar sensors available from IniVation (Switzerland) or Sony (Japan).

As used herein, "event data streams" refers to a sequence of events. An "event" may refer to a change is pixel brightness that exceeds a predefined threshold. In some embodiments, an event may be represented by a vector of four elements: (xk, yk, tk, pk), where: xk, yk are the x and y coordinates of the pixel associated to the event, pk represents the polarity of the event (e.g., −1<-> decreased brightness, +1<-> increased brightness), and tk is the time-stamp marking the event along time (e.g., with micro-second accuracy). Each event, transmitted from the chip using a shared digital output bus ("address-event representation" or AER) includes the (X,Y) location of a pixel, the time t (timestamp, e.g., at microsecond resolution), and the 1-bit polarity p of the brightness change (e.g., brightness increase "ON=1" or decrease "OFF=0") exceeding a configurable threshold (e.g., events can be seen as "moving edges"). Thus, the k-th event may be a tuple: ek=(xk, yk, tk, pk). Events can be processed on an event-by-event basis (e.g., minimum latency) or as packets of events, as a model-based or a model-free (e.g., machine learning) approach.

The event-based sensor may be configured to improve the performance of the frame-based sensor in typical machine vision and automatic identification tasks, such as those related to barcode reading, OCR reading and indicia-based identification in general. Such machine vision tasks may be implemented within various environments, such as in transportation and logistics settings. Such vision tasks may include tasks such as feature detection and tracking, optic flow, image reconstruction, segmentation, object recognition, etc. Embodiments include methods to process the output in order to exploit its application-dependent potential. The processing may depend on the application (e.g., reducing the contrast threshold and/or increasing the resolution produces more events to be processed). Benefits from such processing may include improving the performance of a conventional automatic identification or vision systems that typically work only on image frames, by further associating the frames with a sensor based on a different event-based concept. In some embodiments, the total cost of ownership of the solution may be reduced by saving part of the needed infrastructure (e.g., photocells, presence detectors, wiring, etc.)

FIG. 1 is a simplified block diagram of a machine vision system 100 according to an embodiment of the disclosure. The system includes an event-based sensor (not shown) generating an event data stream 101A, and a frame-based sensor (not shown) generating a frame data stream 101B of the same scene. The separate data streams 101A, 101B (one from each sensor for the same scene) feed two distinct processing steps: a pre-processing step 102 and a main processing step 104 to generate an output.

In the pre-processing phase 102 of the input scene, the pre-processing analysis of event data stream 101A provides, in a real-time fashion, an activation trigger signal 103 that selects the frame useful for the subsequent main-processing phase 104. At the same time, the pre-processing phase 102 may provide any available additional information (e.g., geometrical shape or speed information related to the current scene) for use in the main processing phase 104.

In the main-processing phase 104, processes such as identification algorithms or machine vision may be applied to process the selected image frame (e.g., barcode decoding, OCR reading, inspection tasks, etc.), which may also exploit additional information available to produce the output of the system.

Figure 2:
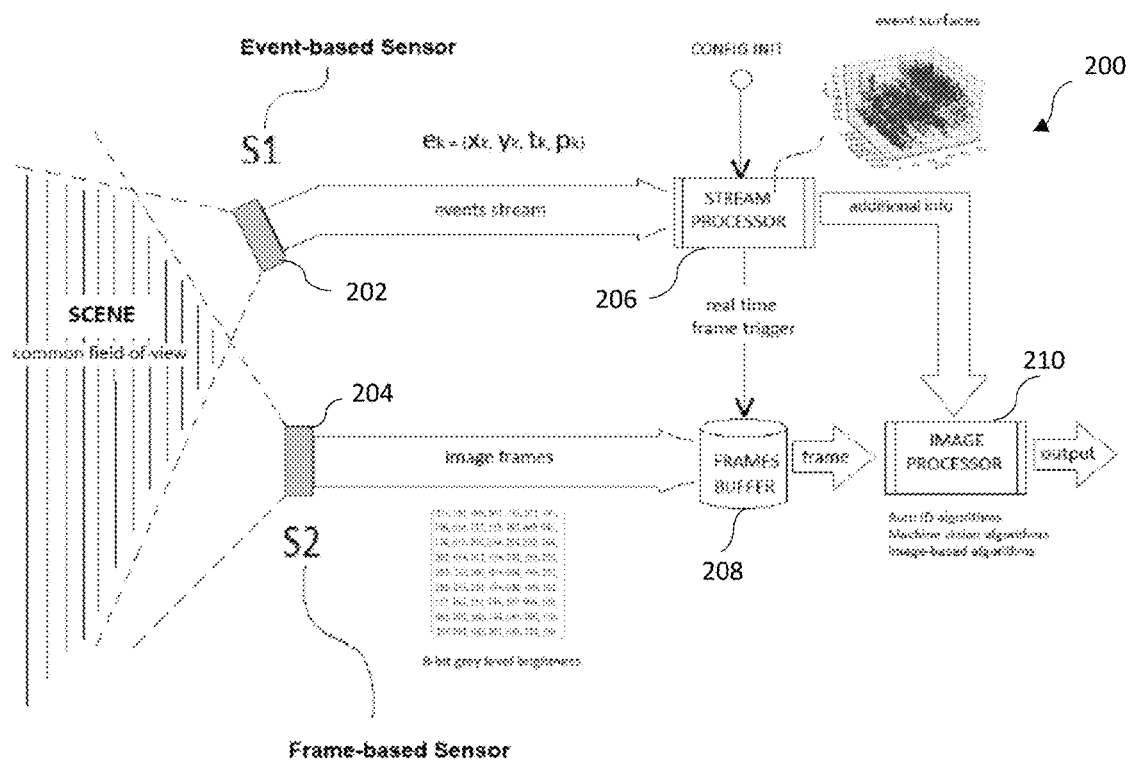
FIG. 2 is a simplified diagram of a vision system including an event-based sensor and a frame-based sensor are framing the same according to an embodiment of the disclosure.

FIG. 2 is a simplified diagram of a vision system 200 including an event-based sensor (S1) 202 and a frame-based sensor (S2) 204 are framing the same scene (e.g., having a common area of overlapping fields-of-view) according to an embodiment of the disclosure. This may occur without the need for spatial or temporal registration of the pixels, which may yield an advantage: the sensors 202, 204 may also be in different positions. Frame-based sensor 204 may be configured as a 1D image sensor or 2D image sensor, and in some embodiments may include one or more frame-based sensors (e.g., including those in a stereo configuration for generating 3D image data). In some embodiments, calibration or time-synchronization among the event-based sensor and the frame-based sensor may not be required.

Events from event-based sensor 202 (e.g., ek=(xk, yk, tk, pk)) and image frames from frame-based sensor 204 may be processed as independent data flows by different algorithms. It is the event stream processor 206, which, after being suitably configured and processing the events, provides the trigger to the frame-buffer 208, in order to start the processing on the next image frame for the imager processor 210 to generate the output. The event stream processor 206 (FIG. 2) is configured to collect metrics related to events. The stream processor 206 may be configured to perform simple and rapid calculations because the event stream from the event-based sensor 202 is verbose by its nature and, on the other hand, the image frame is to be relatively quickly identified to be processed. It should be understood that the event stream processor 206 may include one or more processors configured to executed the same or different software to perform the functions thereof.

Figure 3:
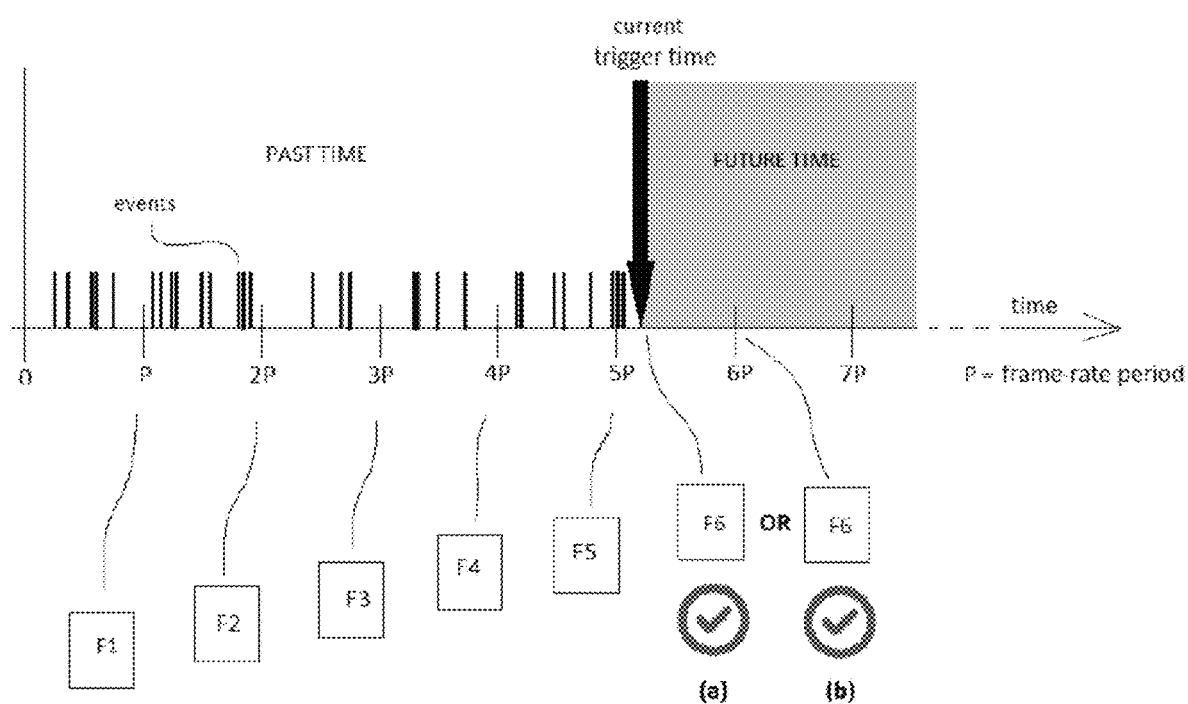
FIG. 3 is a plot showing an example of events generated over time by the event-based sensor in comparison to various image frames captured by the frame-based sensor.

FIG. 3 is a plot showing an example of events generated over time by the event-based sensor (e.g., the event stream) in comparison to various image frames captured by the frame-based sensor (e.g., the image frame stream). In some embodiments, the frame-based sensor may capture images according to a frame rate period (P), such as for example at times P, 2P, 3P, 4P, etc. This periodic image capture may occur during normal operation and/or during low power mode to partially monitor the scene, but at an extended period. During this time, the event-based sensor may also be monitoring the scene and generating events as an independent data flow as described above, and which is asynchronous with respect to the frame-rate period P. As such, embodiments of the disclosure may generate and process a rich event stream with low-latency and high dynamic range coming from the event-based sensor, which may continue even during the "blind time" (i.e., between the frames within frame-rate period P) of the frame-based sensor. As a result, the imaging system may be enabled to exploit a higher quantity of information to understand which frames are important to analyze.

With continued reference to FIG. 3, the frame-based sensor may capture images F1-F5 on its regular interval according to period P. During this time, the event-based sensor may be used to detect activity and generate events for the event stream provided to the stream processor. These events may be generated whenever the activity is detected, even if in the time space between times P, 2P, 3P, etc. The event stream processor may analyze the event stream (e.g., looking at the data within the event vector as well as trends in such data) to determine whether the events meet a criteria for initiating a separate trigger signal. In some embodiments, these frames F1-F5 (captured during the time window labeled "past time") may simply be discarded without further analysis by the image processor if analysis of the event stream does not rise to a level that results in the generation of an event trigger.

Following the collection and analysis of the events collected during the "past time," at the "current trigger time" just after frame F5 (at time 5P), the event stream processor has determined that criteria for generating a trigger signal has been satisfied. Thus, the next frame (or next set of frames) may be of interest for analysis by the image processor. In some embodiments, trigger signal may cause an image frame to be captured outside of the regular frame-rate period corresponding to the current trigger time with minimal delay as is represented by case (a). In this case, the next frame F6 may be captured during the interval between times 5P and 6P responsive to the event trigger and the frame F6 may be processed by the image processor. In some embodiments, the trigger signal may not necessarily cause a separate image capture to occur—rather, the next frame F6 may be captured may simply be the next one according to the fixed frame rate period at time 6P as is represented by case (b). Although it is shown that one frame is processed/analyzed (indicated by the check mark), it is contemplated that a set of image frames may be analyzed by the image processor in response to the event trigger being generated.

Figure 4:
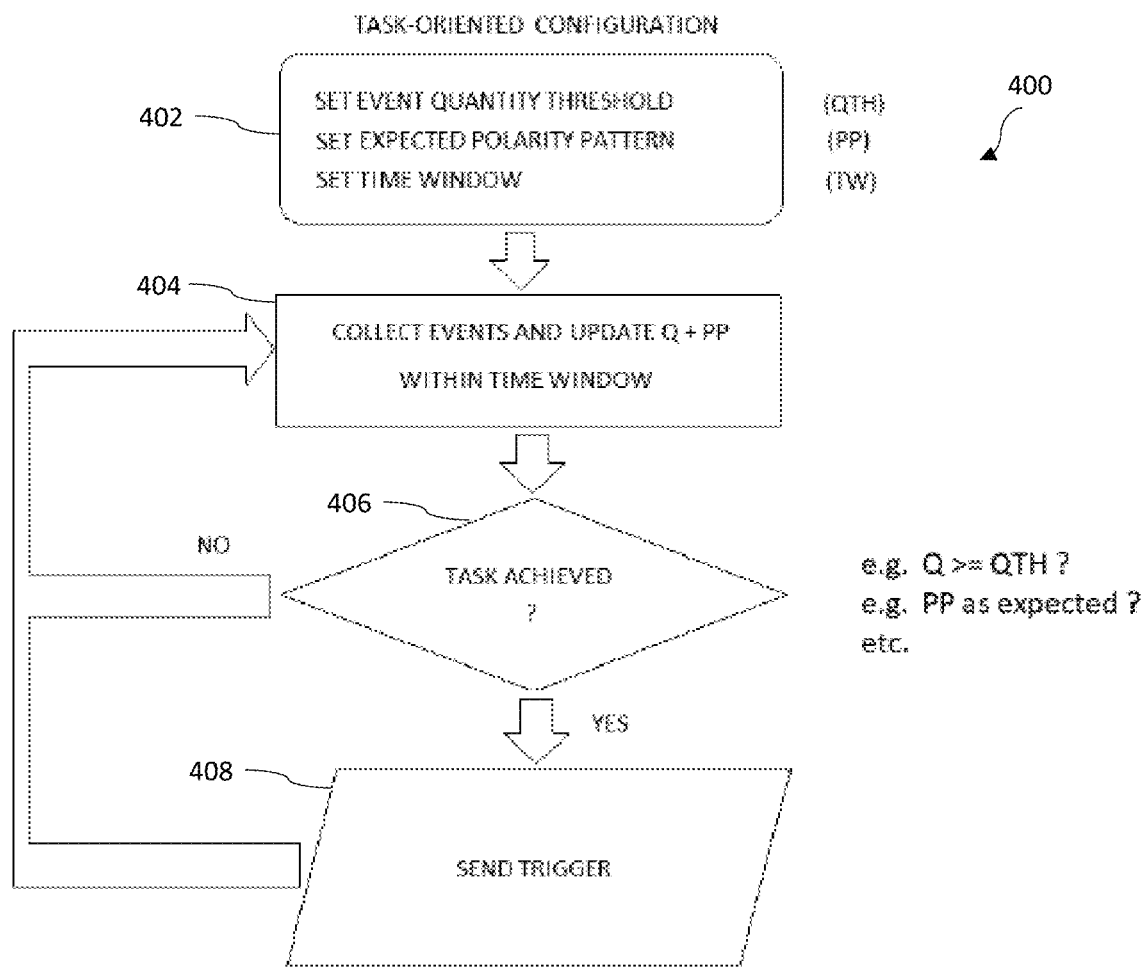
FIG. 4 shows a flowchart illustrating a method for task-oriented configuration of the stream processor according to an embodiment of the disclosure.

FIG. 4 shows a flowchart illustrating a method 400 for task-oriented configuration of the stream processor according to an embodiment of the disclosure. The stream processor may be configured once during system installation to define the minimum threshold of number of events that is necessary to detect (QTH), their polarity pattern (PP, for example 50% at 0 and 50% at 1) and the time window (TW) on which they are collected (operation 402). At operation 404, the events may be collected withing the time window, and with simple and fast operations (i.e., with low computational load) update the status related to the number of events collected and their respective polarity. At operation 406, certain conditions are checked by the stream processor 206 to determine if such conditions are satisfied (e.g., Q>=QTH, PP as expected, etc.). If so, the trigger signal is sent at operation 408. If not, the events may continue to be collected from the event-based sensor and the event stream may continue to be analyzed by the stream processor 206.

Figure 5:
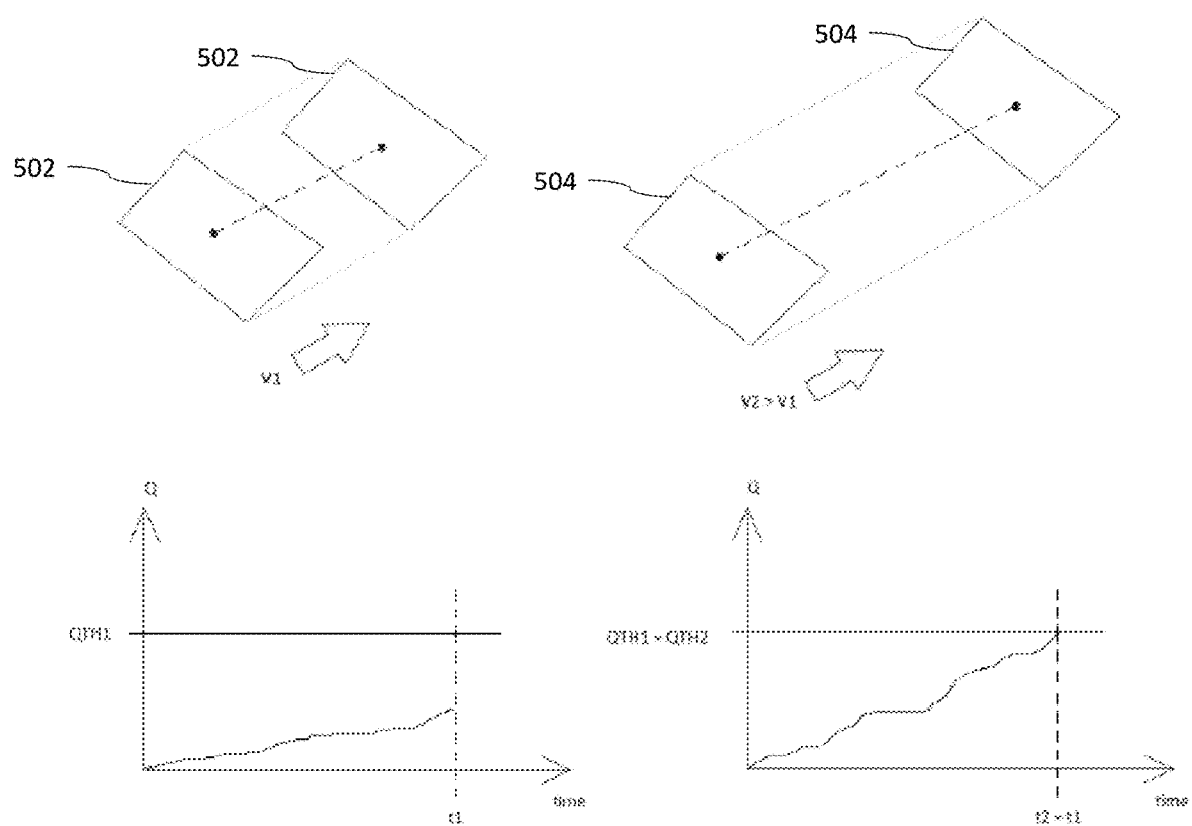
FIG. 5, FIG. 6, and FIG. 7 demonstrate possible configurations of the stream processor that may generate the trigger signal based on different criteria depending on the application.
Figure 6:
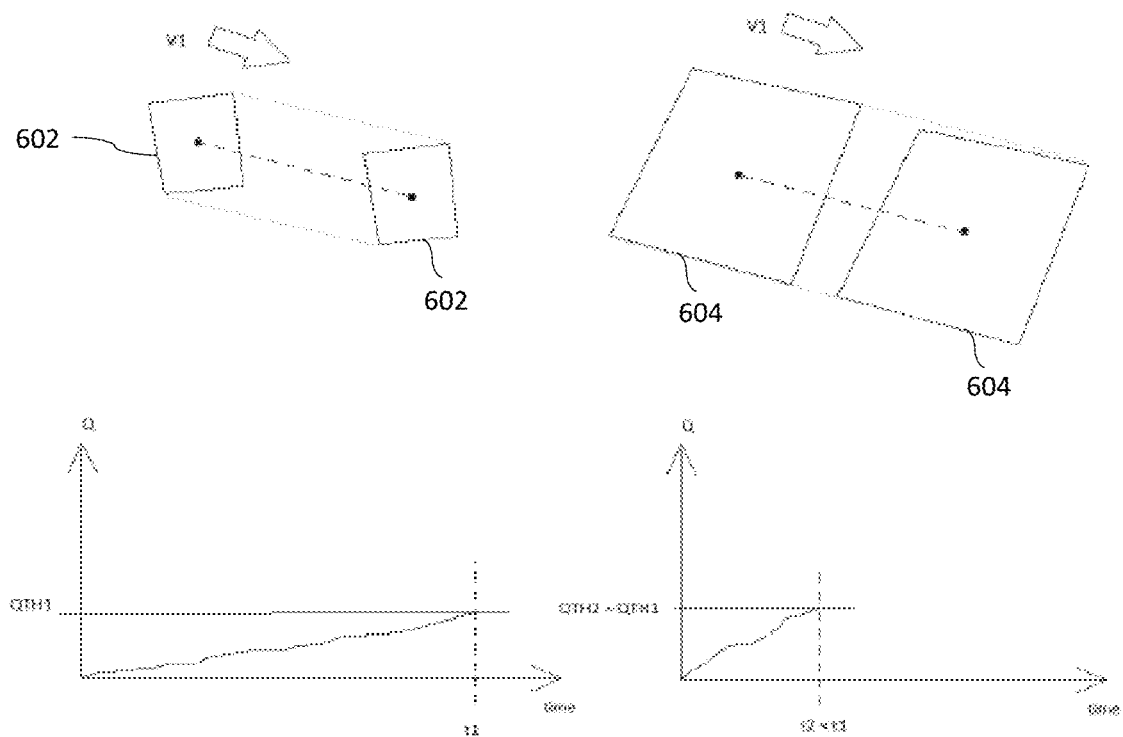
Figure 7:
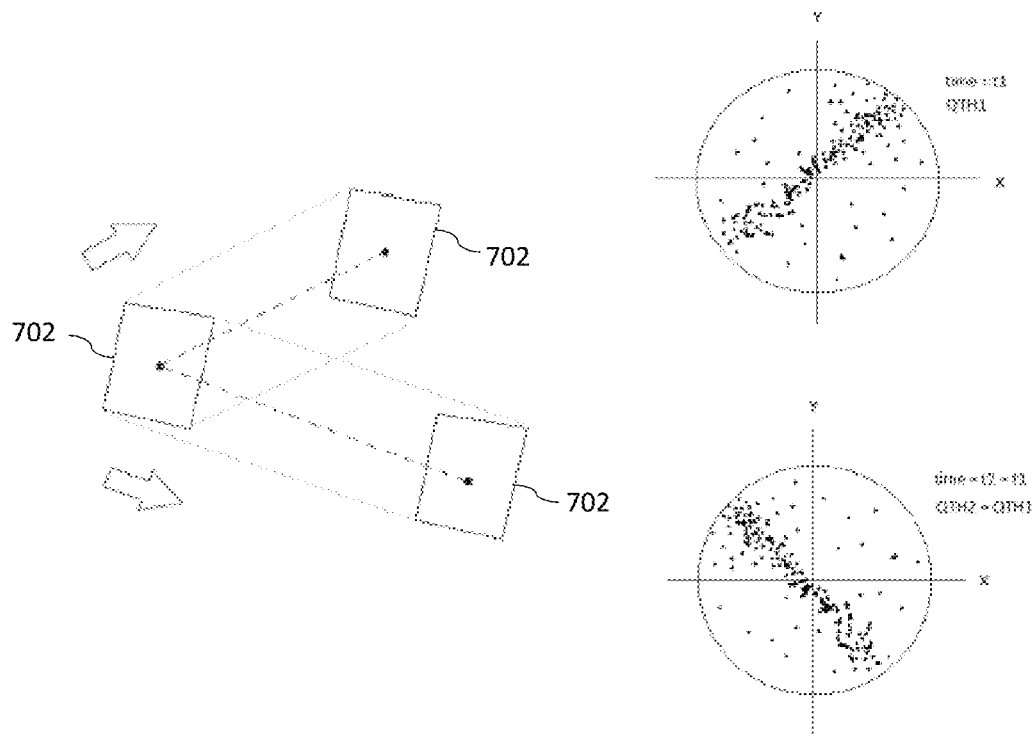

For exemplary purposes, FIG. 5, FIG. 6, and FIG. 7 demonstrate possible configurations of the stream processor 206 (FIG. 2) that may generate the trigger signal based on different criteria depending on the application, while also providing additional information to be supplied to the main-processing task.

In FIG. 5, the triggering may occur based on different speeds of items having a similar size. For example, the package 502 on the left may be moving at a speed of v1 and package 504 on the right may be moving at a speed of v2. The packages 504 may be similar sizes. Based on this criteria set for this exemplary application, the event-based sensor may generate an event in the events stream. Motion direction may be additional information provided to the image processor.

In FIG. 6, triggering may occur based on different sizes of items moving at similar speeds. For example, the package 602 on the left may be moving at a speed of v1 and package 604 on the right may also be moving at a speed of v1. The packages 602, 604 may be different sizes. Based on this criteria set for this illustrative application, the event-based sensor may generate an event in the events stream. Motion direction may be additional information provided to the image processor.

In FIG. 7, triggering may occur based on different motion directions being detected. For example, analyzing the event data stream may determine that the package 702 is moving in a first direction (right-upward direction as shown by the upper arrow). In another example, analyzing the event data stream may determine that the package 702 is moving in a second direction (right-downward direction as shown by the lower arrow). In some embodiments, the criteria for generating the trigger signal may be dependent on a direction of motion of the item (while other movement in other directions may be ignored—resulting in no trigger signal). In addition, the speed and/or size of the item may be additional information provided to the image processor. In some embodiments, the criterial for generating the trigger signal may be dependent on a combination of directions of motion, such as movement of the item in a first direction followed by movement of the item in a second direction.

Thus, by selecting appropriate values (e.g., QTH, TW, PP) for the stream processor parameters, the stream processor 206 may detect special types of moving items, specific speeds, specific motion directions, etc., while filtering out details of the scene that are of no interest. In some embodiments, having items with known sizes, an estimation of their speed may be achieved and used as a soft-encoder signal for related transportation and logistics applications.

Additional advantages of embodiments of the disclosure may include achieved when the frame-based sensor has a high-resolution sensor coupled with wide angle optics. Such an embodiment may be utilized in AutoID applications (where problems related to lighting can be addressed by local lightening of triggered sub-regions) or in machine vision applications (e.g., video surveillance). Wide angle optics may be configured for high depth-of-field especially at a (fixed) hyperfocal length. A high-resolution sensor may enable the acquisition of details rich images. As a result, a fixed camera can cover a bigger part of the scene, which may reduce the installation cost. High-resolution traditional camera operating by itself has the drawback of having to process a large amount of data. Much of this processing may be unnecessary, which may result in high computational cost and energy consumption. Thus, by employing the event-based sensor to generate trigger signals along with additional information provided by the stream processor 206, reducing computations needed for analyzing the scene may be achieved.

Embodiments of the disclosure include dividing both frame-based sensor 204 and the event-based sensor 202 into a grid of smaller sections (also referred to herein as "subparts" or "subsections"). In the frame-based sensor 204 each section of the grid may be analyzed selectively. In addition, exposure for each section of the grid may be controlled independently, such as by selectively activating each section via electronic shutter control. Each subpart of the frame-based sensor 204 may be correlated to a subpart of the event-based sensor 202. As a result, the additional information from the event vector, including the detection of an object, the time of acquisition, the region of interest (ROI) (e.g., namely where something is moving, or that something is moving in a specific direction), etc. can be used to trigger the corresponding subpart(s) of the frame-based sensor 204. As a result, the corresponding subparts of the frame-based sensor 204 (i.e., correlated to the subpart of interest from the event stream) may be triggered and/or analyzed by the image processor instead of the entire image frame, which may result in a smaller amount of data to be computed. In addition, due to their intrinsic high dynamic range, the event-based sensor may not need powerful external lights, which may reduce the total power demand of the system. Information about the speed and direction of the item from the event stream can be used to independently control exposure for each subpart (e.g., vary electronic shutter time for each subpart), and/or to control external light power to improve the quality of the acquisition and the energy consumption.

Figure 8A:
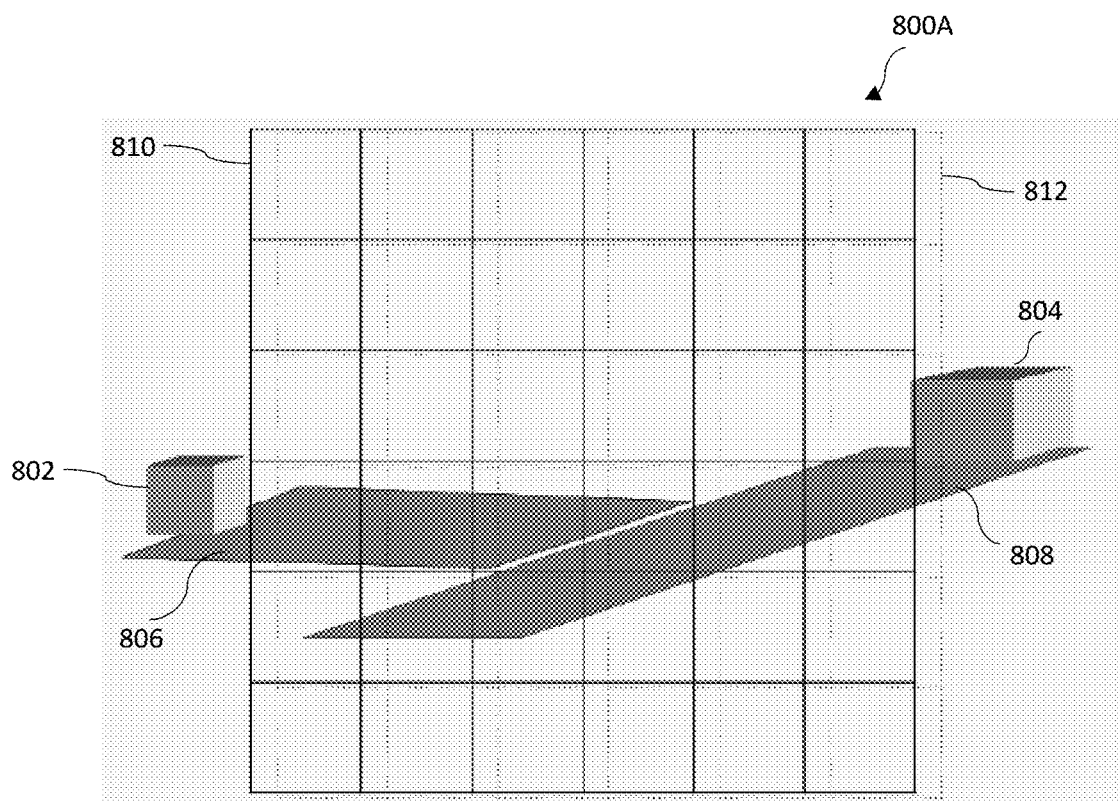
FIGS. 8A-8C are schematic diagrams of a system having two parcels moving on two conveyors.
Figure 8B:
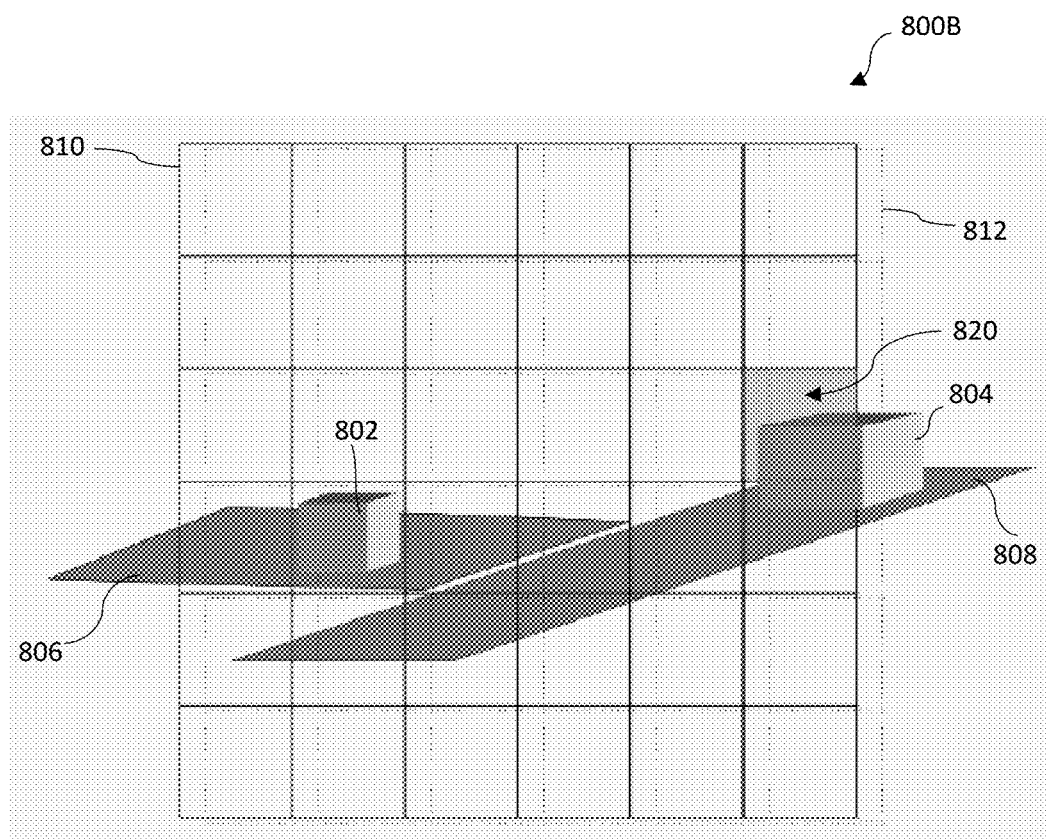
Figure 8C:
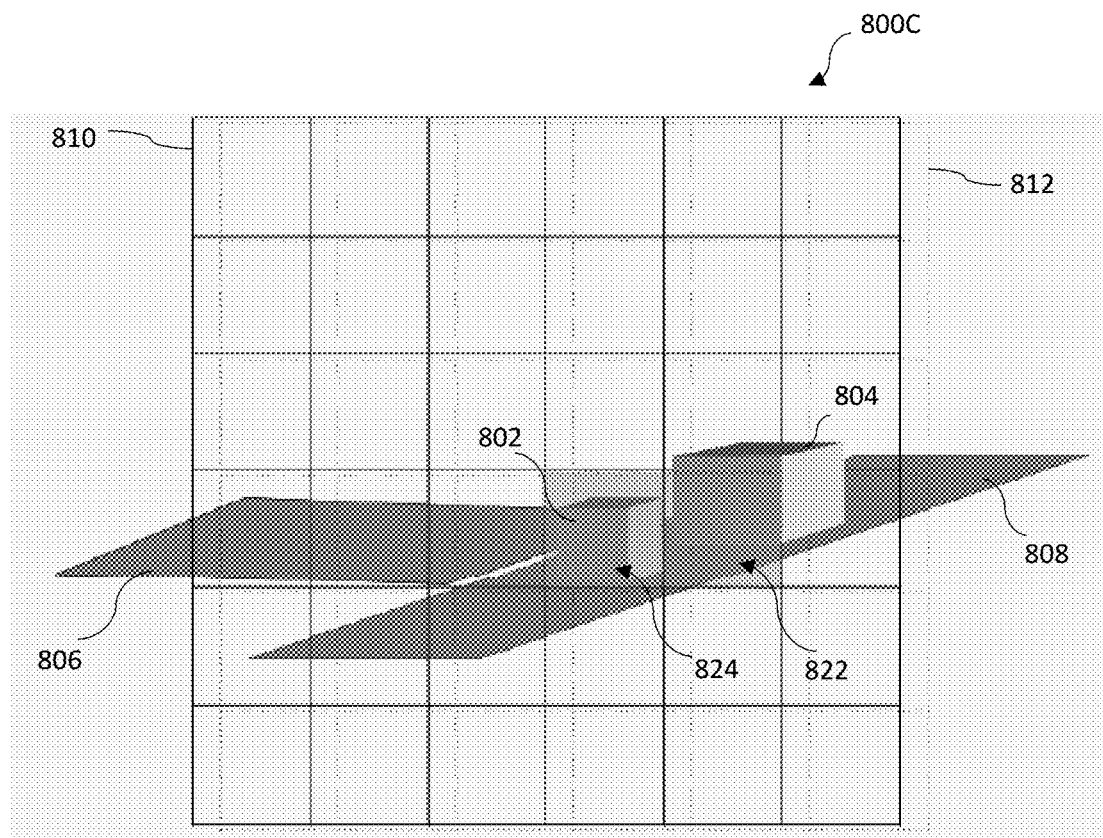

As an example, FIGS. 8A-8C are schematic diagrams 800A-800C of a system having two parcels 802, 804 moving on two conveyors 806, 808. The continuous grid 810 shown in FIGS. 8A-8C represents the image captured by the frame-based sensor. The dashed grid 812 shown in FIGS. 8A-8C represents the image captured from the event-based sensor. The captured scene portion (i.e., FOV) of the two sensors may be slightly different (e.g., offset but having an overlapping area), however, a correspondence may be created between each subframe of the frame-based sensor and each subframe of the event-based sensor.

In FIG. 8A, the parcel 802 on the left side may be located outside of both FOVs 810, 812, and the parcel 804 on the right side may be within in the FOV 812 of the event-based sensor but not in the frame 810 of the frame-based sensor. As a result of being within the FOV 812, events may be generated. However, because both parcels 802, 804 are outside of the FOV 810 of the frame-based sensor the event stream processor may determine that no criteria is met for generating a trigger signal. As a result, no subpart of the frame of the frame-based sensor is processed by the image processor.

FIG. 8B shows both parcels 802, 804 located within both FOVs 810, 812. As a result of the parcels 802, 804 being within the FOV 812 of the event-based sensor, events may be generated that correspond to each parcel 802, 804. In the example, the events generated by the first parcel 802 on the left side are determined by the event stream processor as not satisfying the predetermined criteria (e.g., perhaps because of parcel size, speed, direction of motion, etc.). In this example, the events generated by the second parcel 804 on the right side are determined by the event stream processor to satisfy the predetermined criteria (e.g., perhaps because of parcel size, speed, direction of motion, etc.). Thus, a trigger signal may be generated that is based on the second parcel 804 and not the first parcel 802 in this example. As a result, the corresponding subpart of frame of the frame-based sensor containing the first parcel 802 may not be processed by the image processor, whereas the corresponding subpart 820 of the frame of the frame-based sensor containing the second parcel 804 may be processed by the image processor. In the example shown in FIG. 8B, one subpart 820 (e.g., square of the grid) is shown as being the subpart selected for processing. It is recognized the subpart below subpart 820 also contains a portion of the second parcel 804. In some embodiments, a single subpart containing a particular area of interest may be selected if it is determined that the events associated with the other subpart are not of interest (e.g., the events of that subpart did not meet the predetermined criteria for the event stream). In other embodiments, more than one subpart may be selected for processing responsive to the trigger signal, including all subparts containing the object of interest. In some embodiments, it may be predetermined that a certain number of surrounding subparts may be selected for processing even if the corresponding events of those surrounding subparts did not generate events that satisfied the predetermined criteria.

FIG. 8C shows the first parcel 802 on the left reaching the other conveyor 808. Both the first parcel 802 and the second parcel 804 may cause events detected by the event-based sensor that satisfy the predetermined criteria for generating the trigger. In this example, it may be that the position/movement of the first parcel 802 arriving at the second conveyor 808 is an event condition that satisfies the criteria for generating the trigger. As result, the event trigger may cause corresponding subparts 822, 824 of the frame of the frame-based sensor to be selected for processing.

Embodiments of the disclosure also relate to transportation and logistics systems equipped with both a frame-based sensor and one or more event-based sensors for enabling the system to implement advanced functionalities and provide improved performance at system level. In some embodiments, multiple sensors may be synchronized. The benefits of the present disclosure may include improved imaging systems (e.g., vision systems, transportation and logistics systems, fixed retail scanning in retail environments, etc.), having features enabled by an event-based sensor. Such features may include one or more of the following:

a. Simplified installation.
b. Self-diagnostic capacity of the system to maximize operational availability avoiding disruption for missed maintenance.
c. Capability to manage very thin parcels (no minimum height for the parcel to be processed).
d. Increase operational efficiency, such as for example: dimensioning pallets on the fly when moved with a forklift through a portal or lowering the power consumption for the sensors reading the barcode.
e. Implementing sophisticated feedback to feed a PLC for synchronizing cross belts on sorting parcels.
f. Implementing visual feedback systems for operators supervising a mass flow application, showing singulated items and among this the one not having a readable label (e.g., in red) against the one having a readable label (e.g., in green).

An event-based sensor may be implemented to have a more trustworthy and simpler installation stage for the imaging system that reads parcels running on a conveyor belt.

Figure 9A:
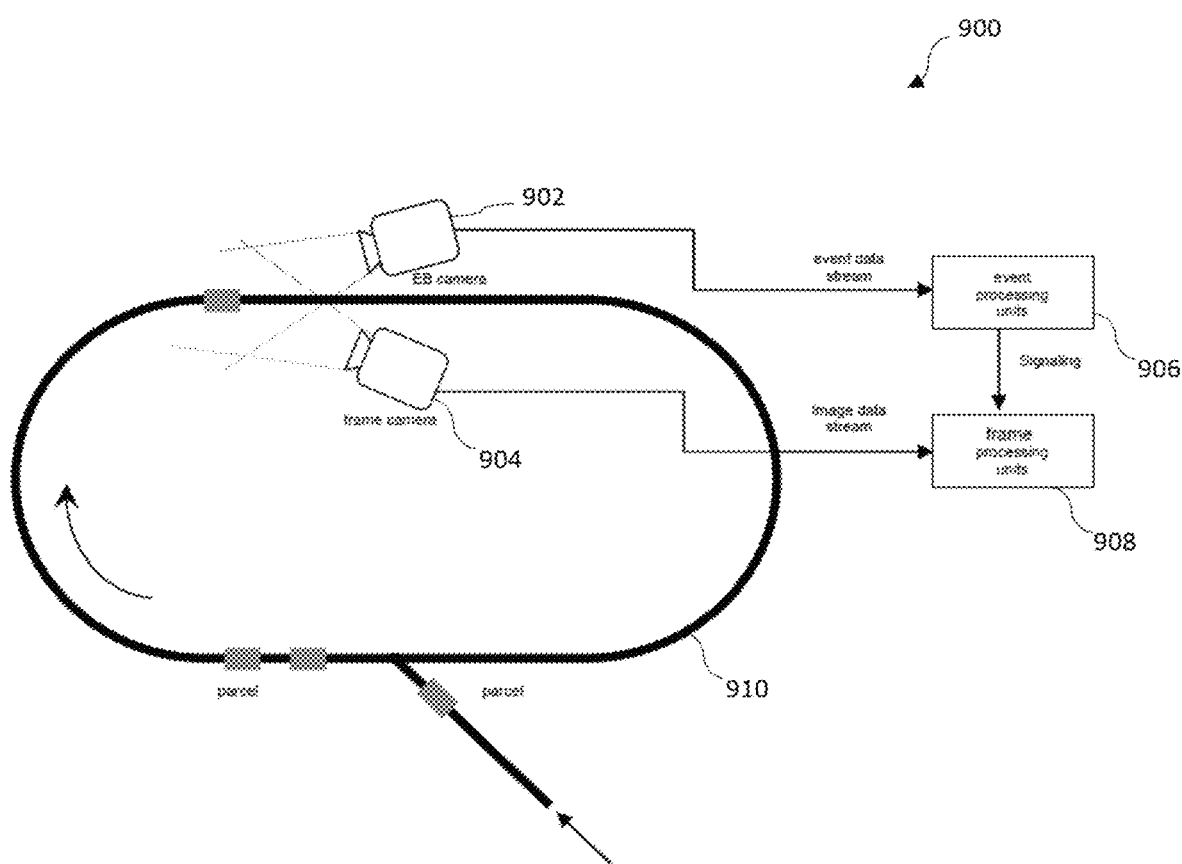
FIGS. 9A-9B shows a typical example of installation of an imaging system for parcel sorting in a transportation and logistics environment.
Figure 9B:
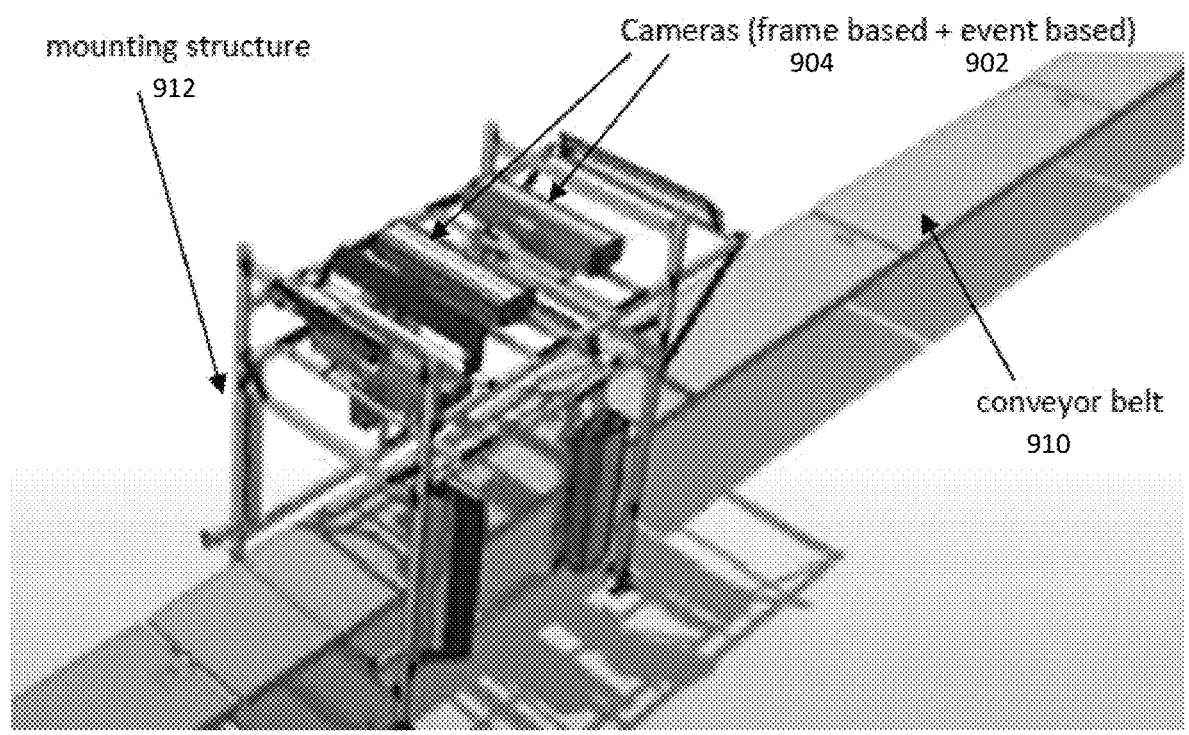

FIGS. 9A-9B show a typical example of installation of an imaging system 900 for parcel sorting in a transportation and logistics environment. The imaging system 900 may include an event-based sensor 902 that generates an event data stream to be processed by an event processing unit(s) 906 (e.g., event stream processor), a frame-based sensor 904 that generates an image data stream to be processed by a frame processing unit(s) 908 (e.g., frames buffer, image processor, etc.) as described above. The imaging system 900 may be configured for barcode reading and other image analysis, which may be positioned to have a field-of-view over a conveyor system 910. Parcels may be fed onto the conveyor system 910 for further transport and/or sorting.

As shown in FIG. 9B, event-based sensor 902 and frame-based sensor 904 may be mounted to a mechanical mounting structure 912 positioned over the conveyor belt 910. The mechanical mounting structure 912 may provide a frame for mounting the frame-based sensor 904 and the event-based sensor 902 directed to view the flow of parcels riding on the conveyor belt 910. Conventional systems often employ a tachometer placed in contact with the conveyor belt to sense the belt speed. Embodiments of the disclosure, however, include the event-based sensor 902 configured to implement a label tracking system to precisely estimate the motion speed of the parcel and to trigger the frame-based camera 904 (barcode reading camera) according to the parcel speed. Knowing the parcel speed and the geometry of the system (locations and fields-of-view of the event-based sensor and of the frame-based sensor) it is possible to predict in real-time what is the best instant to trigger the frame-based sensor to acquire images for barcode reading and also setting the right exposure time to avoid motion blur.

Triggering the frame-based sensor 904 with the event-based sensor 902 may accommodate the triggering and the exposure time for compensating potential fluctuations of the conveyor belt speed to grab just the image frames of the frame-based sensor 904 in which the label is present and that are not affected by any blur. In a preferred embodiment the frame-based sensor 904 and the event-based sensor 902 are integrated into the same housing or into a common mounting structure that provides a precise positioning of the two sensors so make easier the calibration of the two sensors' FOVs (registration of the camera(s)) and preserve the calibration along the life of the system.

In some embodiments, the event-based sensor together with the frame-based sensor may be used to validate the installation and reduce potential problems related to vibrations of the mounting structure 906 on which the frame-based sensor 904 is mounted. The event-based sensor 902 can be configured to characterize vibrations of the mounting structure 906 on which the frame-based sensor 904 is mounted by determining frequency and amplitude. Analysis of the data associated to vibrations allows the event-based sensor 902 to detect situations in which there is a risk to generate motion blur on the frame-based sensor 904. Diagnostic tools can then suggest to move the frame-based sensor 904 to a different position or can suggest a different exposure time to avoid the motion blur. Furthermore, the amplitude of the vibrations may be calculated and used to determine the uncertainty on the superimposition of the two sensor FOVs. This uncertainty on the FOV may be exploited to fine tuning the triggering of the frame-based sensor 904 by processing the information generated by the event-based sensor 902 to have a more robust triggering that avoids having a late activation of the frame-based sensor 904 because of the uncertainty.

Embodiments of the disclosure may also use the event-based sensor 902 to improve the capability of the sorting station by detecting also very thin parcels (e.g., envelopes). Doing so may provide a substantial improvement over conventional sorting stations where the typical solution for triggering a frame-based sensor is with a photosensor that is typically installed on a side of the conveyor to sense the arrival of the parcel. As a result, conventional systems typically are only able to sense parcels having a minimum height. Using the event-based sensor 902, the imaging system may be able to sense even a single sheet of paper.

Embodiments of the disclosure may also include using the frame-based sensor 904 in collaboration with the event-based sensor 902 to achieve a self-diagnostic functionality for the imaging system. As a result, the operational availability of the system may be improved by avoiding disruption for missed maintenance In such a system the event-based sensor 902 may be operable by alternating between at least two different operating modes. In a first operating mode, the event-based senor 902 may be configured to wait for the arrival of a new parcel. The event-based sensor 902 may be configured to detect the presence of a label and track the label and trigger the frame-based sensor 904 to capture and process images related to the label. After generating the trigger signal, the event-based sensor 902 may temporarily switched into a second operating mode in which the event-based sensor 902 monitors vibrations of the conveyor belt 910 with the purpose to detect anomalies associated to degradation of the conveyor belt 910. Such anomalies may be indicative of a loose belt. Anomaly detection may be implemented via analysis of 1D signals associated to the vibrations processed by a traditional software algorithm or a CNN. Data representing vibrations may be generated with a laser projector that projects a pattern on the conveyor belt region included into the event-based sensor FOV.

Figure 10A:
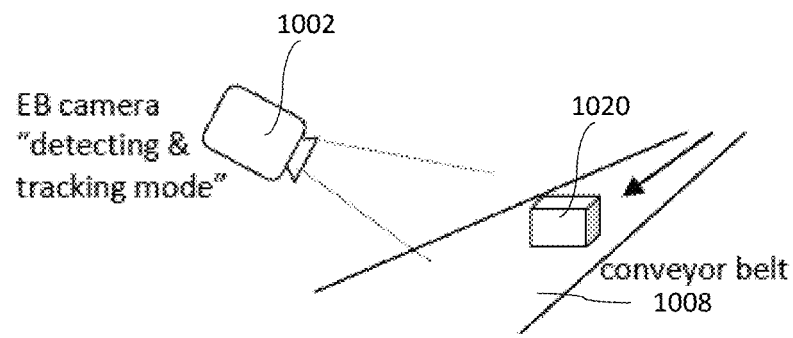
FIGS. 10A-10B shows an event-based sensor operating in different modes according to an embodiment of the disclosure.
Figure 10B:
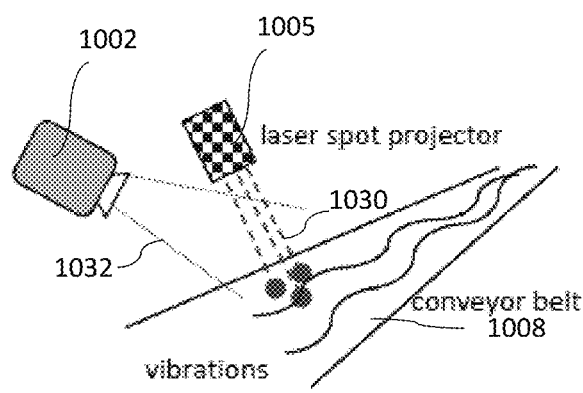

As an example, FIGS. 10A-10B shows an event-based sensor 1002 operating in different modes according to an embodiment of the disclosure. Although a frame-based sensor is not shown in FIGS. 10A-10B, it should be understood that a frame-based sensor may be part of the imaging system as previously described to receive an event trigger based on the event data stream generated by the event-based sensor. The frame-based sensor is not shown so as to simplify the figures and related description.

As shown in FIG. 10A, the event-based sensor 1002 may be configured to operate in a first mode associated with label detection and/or tracking for a parcel 1020 moving along a conveyor belt 1008. Events and related triggers may be generated with parcel and/or label detection as previously described. Such event triggers may be used to trigger a frame-based sensor or otherwise select an image of a frame-based sensor for further analysis as described above.

Figure 11:
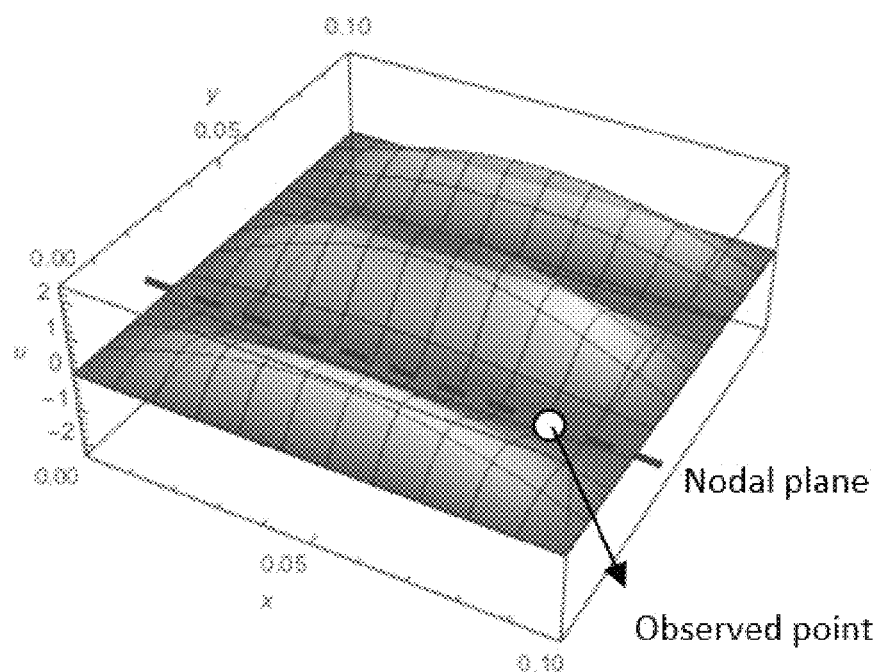
FIG. 11 is a plot showing a nodal region of vibration detected in an embodiment of the disclosure.

As shown in FIG. 10B, the event-based sensor 1002 may be configured to operate in a second mode associated with vibration detection of the conveyor belt 1008. At least one point may be used to generate a minimum of data associated to the vibration of the conveyor. This minimal system fails on sensing vibrations in case the selected point belongs to a nodal region of the vibration (see FIG. 11). For this reason, the imaging system may further include a laser projector 1005 configured to project more complex laser patterns 1030 within the FOV 1032 of the event-based sensor 1002 allowing the event-based sensor 1002 to investigate vibrations in multiple points or regions. The activation of the vibration analysis and the triggering of the event-based sensor 1002 to capture vibration data may be performed by switching on the laser projector 1005 generating the laser pattern 1030.

Figure 12:
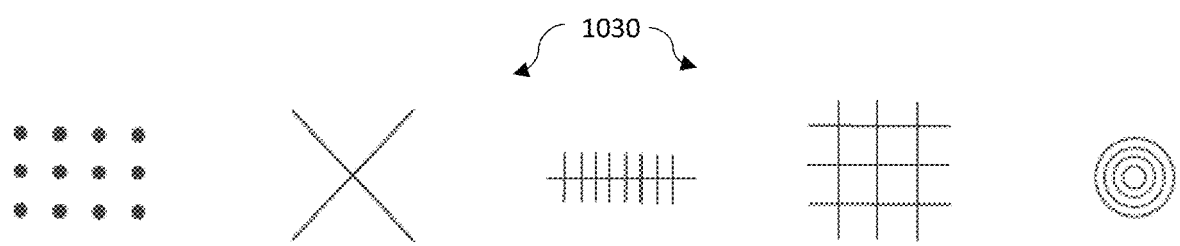
FIG. 12 illustrates various examples of complex laser patterns that may be generated by the laser projector to enable data collection from multiple points or regions.

FIG. 12 illustrates various examples of complex laser patterns 1030 that may be generated by the laser projector 1005 to enable data collection from multiple points or regions. The complex laser patterns may include dots, lines, curvilinear patterns, other shapes, or any combination of thereof suitable for assisting the event-based sensor 1002 to sense vibrations.

In the case of vibrations, the event-based sensor 1002 generates a series of events associated to the movement caused by the vibrations of the conveyor belt in correspondence of the projected laser pattern. By analyzing the amplitude and the distribution of the vibrations, anomalies or any other degradation of the stability of the vibrational modes may be detected. As a result, the mechanical degradation of the conveyor's electromechanical parts may be detected and an alert may be generated to signal that some maintenance is needed. Historical data about monitored/analyzed vibrations on specific conveyor regions can also be of support to make a more precise diagnosis and suggest the kind of maintenance needed by the system.

Embodiments of the disclosure may be configured to have the sorting system manage very thin parcels enabled by the event-based sensor as described above.

Embodiments of the disclosure may include the event-based sensor being combined with a frame-based sensor in a sorting station or other environments (e.g., retail checkout stations). Examples of such additional embodiments follow:

By detecting and tracking an item label with the event-based sensor and knowing the relation among the frame-based sensor FOV and the event-based sensor FOV, just portions of the full-frame image containing the label may be grabbed and also lighter images may be processed for extracting the information related to the label content.

The frame-based sensor may remain in a low power mode until there is detection of the label performed via events generated by the event-based sensor (e.g., power consumption optimization). The same kind of "power saving" can be implemented for the illumination systems integrated into the imaging system that may also be triggered based responsive to the event trigger generated by the analysis of the event stream.

The autofocus (AF) system of the imaging system may be more precise by operating responsive to the event trigger by focusing just on the ROI associated to the label detection (or other region of interest identified by the events) and tracking enabled by the event-based sensor.

Knowing the item (e.g., parcel) speed (e.g., via label tracking or other analysis of the event stream) a frame rate may be selected for the frame-based sensor so as to capture just a predefined number of images to be stitched together for reconstructing the image of the full parcel avoiding an over or under temporal-sampling of the scene.

Morphology analysis performed on objects moving on a conveyor (or otherwise moving in space such as being carried by a user, a vehicle, robot, etc.) can be sped up exploiting the event-based sensor. The event-based sensor may detect the object and extract its contour processing just a limited number of pixels with respect to the analysis performed on the full frame readout from the frame-based sensor. The overall result is a faster classification.

Figure 13:
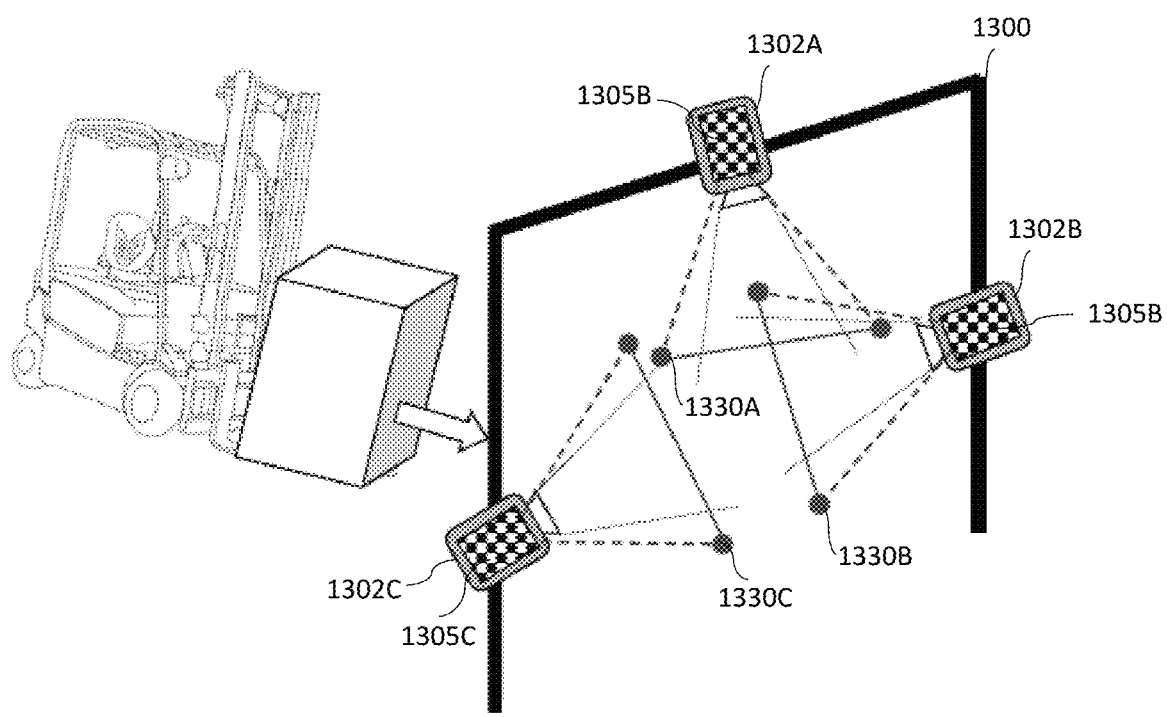
FIG. 13 shows a portal having an imaging system associated therewith according to embodiments of the disclosure.

Dynamic pallet dimensioning may also be achieved by measuring the shape and size of a pallet efficiently via a portal equipped with one or more event-based sensors and one or more laser projectors generating a "sheet of light." FIG. 13 shows a portal 1300 having an imaging system associated therewith according to embodiments of the disclosure. As shown, the illumination system may include a plurality of event-based sensors 1302A, 1302B, 1302C disposed on the frame on the portal 1300. Each event-based sensor 1302A, 1302B, 1302C may also have a corresponding illumination source (e.g., laser projector 1305A, 1305B, 1305C) configured to generate a light pattern (e.g., complex laser pattern 1330A, 1330B, 1330C). Although a frame-based sensor is not shown in FIGS. 10A-10B, it should be understood that a frame-based sensor may be part of the imaging system as previously described to receive an event trigger based on the event data stream generated by the event-based sensor. The frame-based sensor is not shown for simplifying the figures and related description.

In addition, in some embodiments, the event stream from the event-based sensors 1302A, 1302B, 1302C may be used for dynamic dimensioning of objects (e.g., pallets) to reconstruct 3D shape of the object (e.g., pallet). The event-based sensors 1302A, 1302B, 1302C may be registered/calibrated with respect to a common reference system to allow a precise metric reconstruction of the object shape and size. Such an arrangement of event-based sensors 1302A, 1302B, 1302C may be used in other dimensioning implementations, including those of smaller scale fields such as in retail settings (e.g., self-checkout, assisted checkout, etc.), shipping centers, etc. of large scale items as well as individual items of interest for determining dimensions thereof.

Figure 14:
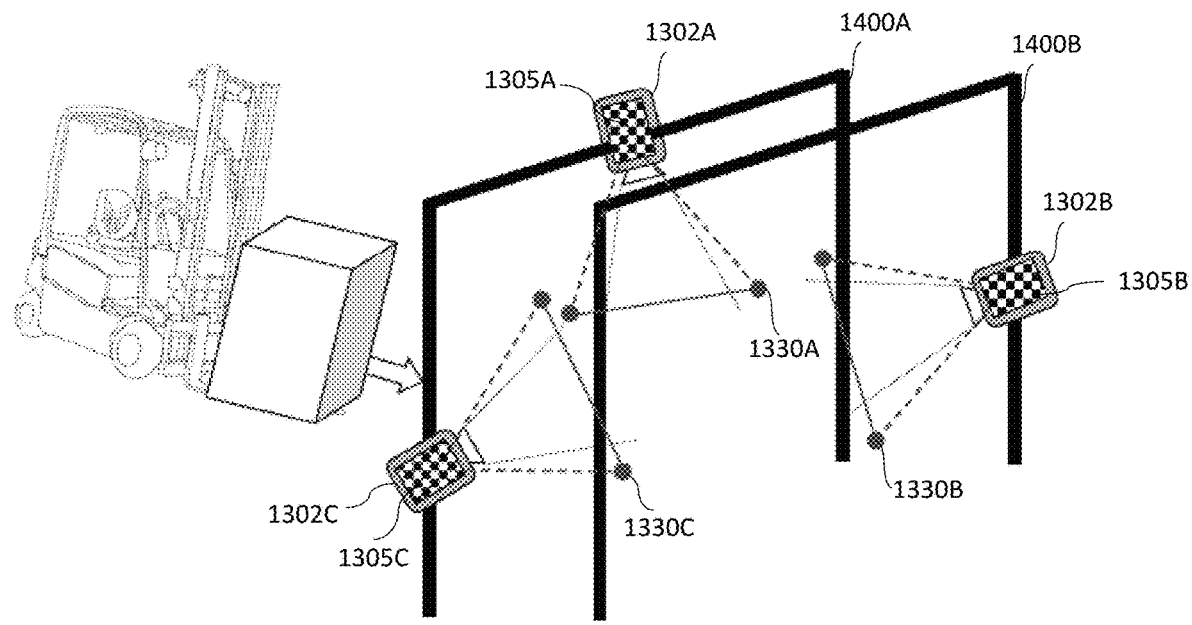
FIG. 14 shows multiple structures having the imaging system associated therewith according to embodiments of the disclosure.

FIG. 14 shows multiple structures 1400A, 1400B having the imaging system associated therewith according to embodiments of the disclosure. As shown in FIG. 14, the event-based sensor 1302A, 1302B, 1302C (and any corresponding laser projectors 1330A, 1330B, 1330C) may be disposed on multiple mounting structures 1400A, 1400B to be spaced along the motion direction of the object (e.g., carried by a forklift or other vehicle, or by a user, robot, etc.). Although just three event-based sensor 1302A, 1302B, 1302C to be disposed on the different structures 1400A, 1400B (e.g., portals, ceilings, walls, etc.), it is contemplated that each structure may include any number of event-based sensors as desired for a particular application. The event-based sensor 1302A, 1302B, 1302C may be registered, and the distance among the event-based sensors 1302A, 1302B, 1302C may be known. Knowing this distance, the system processor may be configured to perform the calculation of the object speed that may also be used to estimate the length of the object.

Figure 15:
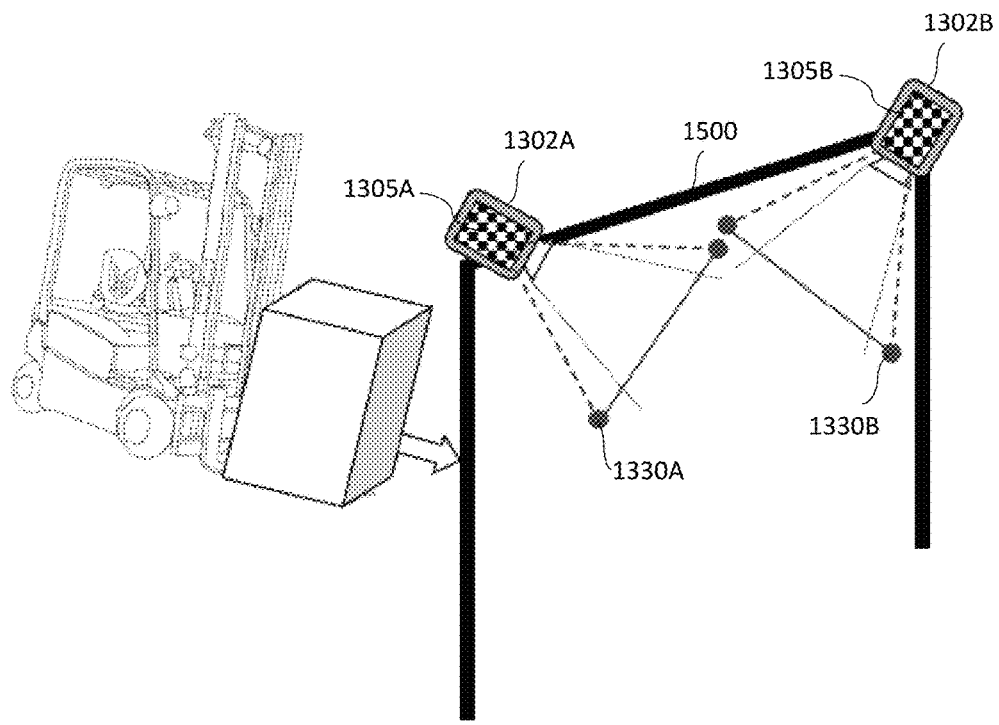
FIG. 15 shows a portal having an imaging system associated therewith according to embodiments of the disclosure in which two event-based sensors are disposed thereon in a stereo arrangement.

FIG. 15 shows a portal 1500 having an imaging system associated therewith according to embodiments of the disclosure in which two event-based sensors 1302A, 1302B (and corresponding laser projectors 1330A, 1330B generating a sheet of light) are disposed thereon in a stereo arrangement. In this embodiment, the event stream of the event-based sensors may be combined to implement a stereo camera system. Camera registration may be performed in case the system is compound by two different cameras. In some embodiments, a stereo camera including multiple event-based sensors 1302A, 1302B may be constructed within a single housing that contains both event-based sensors 1302A, 1302B that are calibrated for 3D measurement.

Figure 16:
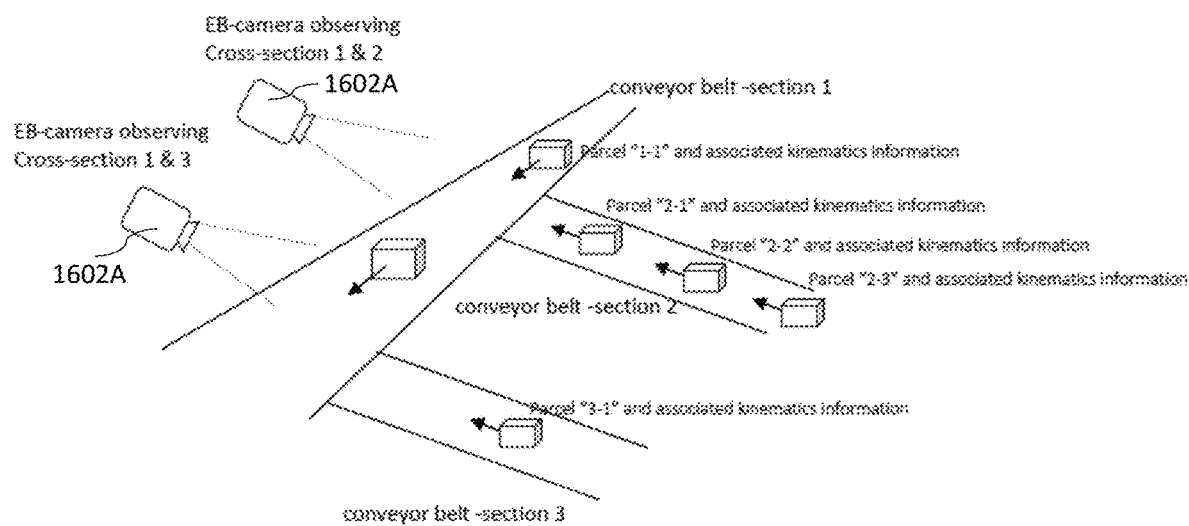
FIG. 16 shows an example of an imaging system including multiple event-based sensors monitoring different sections of a cross-belt system according to an embodiment of the disclosure.

FIG. 16 shows an example of an imaging system including multiple event-based sensors 1602A, 1602B monitoring different sections of a cross-belt system according to an embodiment of the disclosure. The event-based sensors 1602A, 1602B may generate an event stream used to track multiple parcels by extracting kinematic information (e.g., position and speed) about the parcels running on different sections the observed conveyor belt section, and provide real-time feedback of such information to a PLC responsible for synchronizing the conveyor belt sections for merging parcel flow. Responsive to this feedback, the PLC may control the belts within the cross-belt system, including adjusting belt speed, maintaining a continuous running of the belt, stopping a conveyor belt, etc. PLC decisions may be implemented in order to avoid parcel collisions and/or preserve a minimum spacing among parcels on the main conveyor belt section in which the parcels are collected.

Embodiments of the disclosure also include an imaging system including an event-based sensor to efficiently detect (e.g., via light processing) items contours and labels of an item. Such imaging may be used to support human-operated mass flow applications. For example, items with no visible label may be detected and a visual feedback applied to a frame-based image may be generated for an operator that can handle the items and change their pose so to make visible the label or to apply a new label on them.

Figure 17A:
FIGS. 17A-17B show an example image set demonstrating feedback that may be provided to an operator in a mass flow application environment.
Figure 17B:

FIGS. 17A-17B show an example image set demonstrating feedback that may be provided to an operator in a mass flow application environment. FIG. 17A is an image captured with a frame-based sensor (e.g., a color camera of a mass flow detection system). An event-based sensor may have a similar field-of-view (e.g., overlapping) to generate events associated with the items detected, labels detected, etc. FIG. 17B is an image showing feedback that is generated responsive to the analysis of the event stream of the event-based sensor. In this example, items with a regular label detected based on the event-based sensor output are highlighted in green (e.g., two parcels in the background), whereas items without a visible label detected are highlighted in red (e.g., parcel and tire in the foreground).

Embodiments of the disclosure also include implementation of one or more event-based sensors in a retail environment, such as a self-checkout and/or assisted checkout station. Such event-based sensors may be used to identify objects, track objects, dimension objects, etc. in a manner similar to those described above, but doing so during a checkout process within a checkout area. Different configurations and details regarding the construction and components of a fixed retail scanner are contemplated. An example of such a system, including examples of various triggering events contemplated within embodiments of the disclosure are described in U.S. Provisional Patent Application Ser. No. 63/293,596, filed Dec. 23, 2021, and entitled "FIXED RETAIL SCANNER WITH ON-BOARD ARTIFICIAL INTELLIGENCE (AI) ACCELERATOR MODULE AND RELATED METHODS," the disclosure of which is incorporated herein by reference in its entirety.

The field-of-view of the event-based sensor(s) may at least partially overlap with one or more image-based sensors in the imaging system, such as those employed within a field-of-view of a bi-optic scanner or single plane scanner (e.g., monochrome imagers, color imagers) used for reading barcodes, produce recognition, item recognition, security applications, etc. In some embodiments, the event-based sensor(s) may at least partially overlap with one or more image-based sensors used in connected devices outside of the scanner housing, such as a top-down reader, auxiliary cameras, overhead cameras, etc. that may be directed at the scanning area of the primary barcode reader or at other locations in the checkout area. In other embodiments, the one or more event-based sensors may be directed at other areas not covered by frame-based sensors. The event-based sensor(s) may be located within the base scanner housing, outside of the base scanner housing, or the system may include one or more event-based sensors that are located within the base scanner housing and one or more event-based sensors that are located external to the base scanner housing providing different fields-of-view of the scanning area.

The event stream of the event camera may be analyzed to detect events, such as objects entering the scanning area, hands moving across the scanning area, shopping carts, baskets, etc. Directional movement, speed, and patterns of movement of such objects may also be detected by analyzing the events stream from the event-based sensor, which may generate a trigger signal to control one or more imagers of the system (or otherwise select certain frames, or subparts of frames) for further processing and analysis as described above. Doing so may reduce the processing resources needed for certain activities, such as security analysis, fraud detection, produce recognition, etc. that may not need to be performed as frequently as barcode reading or that may use cameras not needed for every situation. In some embodiments, such a trigger signal generated by the event stream processor may also be combined with other triggering data, such as weight information, EAS tag data, RFID data, etc. for further refinement of triggering events. Other activities may also be initiated responsive to the trigger signal based on the event stream, such as active illumination used for such frame-based sensors, as well as certain analysis activities such as AI analysis of image data—using local and/or remote AI resources, and determining which data from the different frame-based sensors should be used in such AI analysis.

Additional non-limiting embodiments include:

Embodiment 1. An imaging system, comprising: a frame-based sensor configured to generate image frames of a scene; an event-based sensor configured to generate an event stream; and a stream processor configured to receive the event stream and analyze the events to determine if a predetermined criteria for the event stream is satisfied, and in response thereto generate a real-time frame trigger to select one or more image frames captured by the image processor for analysis by an image processor.

Embodiment 2. The imaging system of Embodiment 1, wherein the imaging system is a machine vision system.

Embodiment 3. The imaging system of Embodiment 1, wherein the imaging system is a mass flow detection system.

Embodiment 4. The imaging system of any of Embodiments 1 through 3, wherein further comprising a frames buffer that receives the image frames from the frame-based sensor, and sends a selected frame to the image processor in response to the frame trigger.

Embodiment 5. The imaging system of any of Embodiments 1 through 4, wherein the stream processor is configured to detect item size from the event stream for determining whether to generate the frame trigger.

Embodiment 6. The imaging system of any of Embodiments 1 through 5, wherein the stream processor is configured to detect speed of movement for an item from the event stream for determining whether to generate the frame trigger.

Embodiment 7. The imaging system of any of Embodiments 1 through 6, wherein the stream processor is configured to detect direction of movement for an item from the event stream for determining whether to generate the frame trigger.

Embodiment 8. The imaging system of any of Embodiments 1 through 7, wherein the stream processor is configured to detect a pattern of movements for an item from the event stream for determining whether to generate the frame trigger.

Embodiment 9. The imaging system of any of Embodiments 1 through 8, wherein the stream processor is configured to detect one or more of an item size, speed, movement direction, or movement pattern for a plurality of different items relative to each other for determining whether to generate the frame trigger.

Embodiment 10. The imaging system of any of Embodiments 1 through 9, wherein the frame-based sensor is configured to exit a low power mode in response to the frame trigger from the stream processor.

Embodiment 11. The imaging system of any of Embodiments 1 through 10, wherein the frame-based sensor is configured to capture image frames according to a fixed frame rate period while the event-based sensor detects events asynchronously from the image frame capture.

Embodiment 12. The imaging system of any of Embodiments 1 through 11, wherein the frame-based sensor captures a separate image frame outside of the regular fixed rate period in response to the frame trigger initiated by the stream processor based on the event stream data.

Embodiment 13. The imaging system of any of Embodiments 1 through 12, wherein the predetermined criteria includes a set event quantity threshold, a set expected polarity pattern, and a set time window.

Embodiment 14. The imaging system of any of Embodiments 1 through 13, wherein the frame-based sensor is a high resolution image sensor.

Embodiment 15. The imaging system of any of Embodiments 1 through 14, wherein fields-of-view for the event-based sensor and the frame-based sensor are subdivided into smaller sub-parts that are correlated to each other.

Embodiment 16. The imaging system of Embodiment 15, wherein selection of the one or more image frames for analysis by the image processor includes selecting one or more smaller sub-parts of a full image frame and excluding other smaller sub-parts of the image frame from the analysis.

Embodiment 17. The imaging system of any of Embodiments 1 through 16, wherein the frame-based sensor and the event-based sensor are mounted to a mounting structure positioned over a conveyor system.

Embodiment 18. The imaging system of any of Embodiments 1 through 17, further comprising a laser projector configured to project a complex laser pattern a field-of-view of the event-based sensor for assisting the analysis of the event stream.

Embodiment 19. The imaging system of any of Embodiments 1 through 18, wherein the analysis of the event stream detects vibrations within the field-of-view of the event-based sensor.

Embodiment 20. The imaging system of any of Embodiments 1 through 19, wherein the imaging system is located at a retail checkout station.

Embodiment 21. The imaging system of any of Embodiments 1 through 20, wherein the frame-based sensor is located within a housing of a bi-optic barcode reader.

Embodiment 22. An imaging system, comprising: a plurality of event-based sensors having fields-of-view that at least partially overlap; a plurality of laser projectors associated with each of the event-based sensors, and configured to project a complex laser pattern in a corresponding field-of-view of the associated event-based sensor; and an event stream processor configured to analyze event streams from each of the event-based sensors and to determine at least one characteristic of an object based on the event streams.

Embodiment 23. The imaging system of Embodiment 22, wherein the at least one characteristic includes dimensions of the object.

Embodiment 24. The imaging system of any of Embodiments 22 through 23, wherein the at least one characteristic includes speed of movement for the object.

Embodiment 25. The imaging system of any of Embodiments 22 through 24, wherein the plurality of event-based sensors and the plurality of laser projectors are disposed on a single mounting structure.

Embodiment 26. The imaging system of any of Embodiments 22 through 25, wherein the plurality of event-based sensors include a first event-based sensor disposed on a first mounting structure and a second event-based sensor disposed on a second mounting structure.

Embodiment 27. The imaging system of any of Embodiments 22 through 26, wherein the plurality of event-based sensors include a first event-based sensor and a second event-based sensor arranged in a stereo configuration.

Embodiment 28. A conveyor system including an illumination system, comprising: a conveyor system controlled by a programmable logic controller (PLC); a plurality of event-based sensors having fields-of-view over the conveyor system; and an event stream processor configured to analyze event streams from each of the event-based sensors and to provide feedback to the PLC for the PLC to control movement of the conveyor system based on kinematics information for parcels on the conveyor system as determined from the event streams.

Embodiment 29. A conveyor system including an illumination system, comprising: a conveyor system; an event-based sensor having a field-of-view over the conveyor system; and an event stream processor configured to: analyze event streams from the event-based sensors; detect vibrations of the conveyor system based on the event stream; and generate a diagnostic report based on the detected vibrations.

Embodiment 30. The conveyor system of claim 29, further comprising a laser projector configured to project a complex laser pattern in the field-of-view of the event-based sensor.

The foregoing descriptions are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although operations may be describes as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. An imaging system, comprising:
   a frame-based sensor configured to generate image frames of a scene;
   an event-based sensor configured to generate an event stream; and
   a stream processor configured to receive the event stream and analyze the events to determine if a predetermined criteria for the event stream is satisfied, and in response thereto generate a real-time frame trigger to select one or more image frames captured by the image processor for analysis by an image processor, wherein the imaging system is located at a retail checkout station having the event-based sensor disposed within a housing of a bi-optic barcode reader or external to the housing of the bi-optic barcode reader.

2. The imaging system of claim 1, further comprising a frames buffer that receives the image frames from the frame-based sensor, and sends a selected frame to the image processor in response to the frame trigger.

3. The imaging system of claim 1, wherein the stream processor is configured to detect item size from the event stream to determine whether to generate the frame trigger.

4. The imaging system of claim 1, wherein the stream processor is further configured to detect speed of movement for an item from the event stream to determine whether to generate the frame trigger.

5. The imaging system of claim 1, wherein the stream processor is further configured to detect direction of movement for an item from the event stream to determine whether to generate the frame trigger.

6. The imaging system of claim 1, wherein the stream processor is further configured to detect a pattern of movements for an item from the event stream to determine whether to generate the frame trigger.

7. The imaging system of claim 1, wherein the stream processor is further configured to detect one or more of an item size, speed, movement direction, or movement pattern for a plurality of different items relative to each other to determine whether to generate the frame trigger.

8. The imaging system of claim 1, wherein the frame-based sensor is further configured to exit a low power mode in response to the frame trigger from the stream processor.

9. The imaging system of claim 1, wherein the frame-based sensor is further configured to capture image frames according to a fixed frame rate period while the event-based sensor detects events asynchronously from the image frame capture.

10. The imaging system of claim 1, wherein the frame-based sensor captures a separate image frame outside of the regular fixed rate period in response to the frame trigger initiated by the stream processor based on the event stream data.

11. The imaging system of claim 1, wherein the predetermined criteria includes a set event quantity threshold, a set expected polarity pattern, and a set time window.

12. The imaging system of claim 1, wherein the frame-based sensor is a high resolution image sensor.

13. The imaging system of claim 12, wherein fields-of-view for the event-based sensor and the frame-based sensor are subdivided into smaller sub-parts that are correlated to each other, and wherein selection of the one or more image frames for analysis by the image processor includes selecting one or more smaller sub-parts of a full image frame and excluding other smaller sub-parts of the image frame from the analysis.

14. An imaging system comprising:
a frame-based sensor configured to generate image frames of a scene;
an event-based sensor configured to generate an event stream;
a stream processor configured to receive the event stream and analyze the events to determine if a predetermined criteria for the event stream is satisfied, and in response thereto generate a real-time frame trigger to select one or more image frames captured by the image processor for analysis by an image processor; and
a laser projector configured to project a complex laser pattern in a field-of-view of the event-based sensor for assisting the analysis of the event stream, wherein the analysis of the event stream detects vibrations within the field-of-view of the event-based sensor.

15. An imaging system, comprising:
a plurality of event-based sensors having different fields-of-view directed to different conveyor sections of a cross-belt system;
an event stream processor configured to analyze event streams from each of the event-based sensors and to determine at least one characteristic including at least a position and speed of an object based on the event streams; and
a programmable logic controller configured to synchronize the different conveyor sections responsive to the determined characteristics for merging parcel flow in the cross-belt system.

16. The imaging system of claim 1, wherein the event-based sensor is disposed within at least one of a top-down reader, an auxiliary camera, or an overhead camera directed at a scanning area of the bi-optic barcode reader or an area proximate thereto in a checkout area.

17. The imaging system of claim 14, wherein the event-based sensor is configured to alternate between different operating modes including a first operating mode configured to detect and/or track an object within the field-of-view of the event-based sensor, and a second operating mode configured to detect vibrations within the field-of-view of the event-based sensor.

18. The imaging system of claim 14, wherein the frame-based sensor and the event-based sensor are mounted to a mounting structure positioned over a conveyor system.

19. The imaging system of claim 14, wherein the vibrations are vibrations of a conveyor belt within the field-of-view of the event-based sensor.

20. The imaging system of claim 19, wherein the event stream processor is further configured to provide vibration data to processor to monitor the vibrations for detecting anomalies associated with degradation of the conveyor belt.

* * * * *